3,246,767
FLUID-PERMEABLE MATERIALS AND PROCESS OF MAKING THE SAME

David B. Pall, Roslyn Estates, and Cyril A. Keedwell, Jericho, N.Y., assignors to Pall Corporation, Glen Cove, N.Y., a corporation of New York
Filed Aug. 6, 1962, Ser. No. 215,151
19 Claims. (Cl. 210—505)

This application is a continuation-in-part of Serial No. 98,595, filed March 27, 1961.

This invention relates to microporous fluid-permeable materials such as filters and to a process for preparing such materials, characterized by high permeability to fluids, comprising a porous base having adhered thereto a microporous fibrous layer having a high voids volume, generally at least about 75%, a maximum port size less than about 10 microns and a proportion of fibers extending outwardly from the base at an angle greater than about 30°.

A most difficult type of filter to manufacture is one having ultrafine or micro pores whose maximum diameter is 10 microns, and which has no pores beyond the permissible maximum. Microporous membrane filters have been developed such as, for example, those described in U.S. Patents Nos. 1,421,341 to Zsigmondy; 1,693,890 and 1,720,670 to Duclaux; 2,783,894 to Dovell et al.; 2,864,777 to Robinson; and 2,944,017 to Cotton. These filters are, however, quite dependent upon the physical properties of the plastic material used in their preparation, are frequently brittle and fragile, especially if pore volume is high, deteriorate rapidly when exposed to temperatures above 200°–250° F., and are in any case expensive compared to similar porous media of comparable properties but unduly large pores, such as paper and nonwoven fibrous bats.

In order to overcome their fragility, it has been proposed to lay them down on a paper base, but it is hard to obtain good adhesion between the plastic and the paper, so that the membrane separates or breaks when bent or upon application of an appreciable back pressure differential. For these reasons, plastic membrane composites can be used only in flat sheet, and not in the more efficient pleated filter elements.

Reinforced microporous plastic membranes in which the membrane is laid down on a fabric have been prepared, but since these are not sufficiently self-supporting or rigid, the layers tend to separate when formed into pleated structures.

The available paper filters are economical, but unfortunately do not have ultrafine pores. Paper filters having ultrafine pores of about 2 to 4 microns are manufactured but such products also have a proportion of pores ranging up to 20 microns or more. It is very difficult if not impossible to prepare, at a reasonable cost, papers having both a useful voids volume and substantially no pores more than 10 microns in diameter. This is also true of conventional nonwoven fibrous bats. In addition, such ultrafine pore papers or nonwoven fibrous bats are generally characterized by extremely low fluid permeability, and a high pressure drop, due to a voids volume of between about 20 and 40%, too low for use in many applications, including the filtration of large quantities of viscous fluids.

The permeability of a filter to fluids is a function of pore size and percent voids volume. The higher the percent voids volume, at a given pore size and filter thickness, the larger the flow rate, i.e., the volume of fluid, that can be filtered per unit area and time. In the case of filters having an average pore size of more than 25 microns, a filter medium with as low as 20% voids volume may have adequate permeability. However, in the case of microporous filters, having an average pore size of 10 microns or less, a greatly increased resistance to flow is created as a result of the very small pore size, so that it is essential to have as high a voids volume as possible. For example, a microporous filter having an average pore size of about 1 micron and a voids volume under about 50% is essentially unsatisfactory for many applications since the flow rate will be too slow to be practical. For most applications, microporous filters have been found to require a voids volume in excess of 75% and frequently in excess of 85%.

Thus, a useful microporous filter should have the following attributes:

(1) It should have a microporous structure in which no pore is larger than about 10 microns.

(2) The microporous structure should have a high voids volume, preferably a voids volume of at least 75%.

(3) The product should have a high resistance to compression and back pressure.

(4) The product should withstand as high a temperature as possible. Useful strength at 275° F. is very desirable to permit steam sterilization or hydraulic fluid filtration, both commonly accomplished at this temperature. Useful strength at 400° F. is needed for sterilization by and filtration of hot air.

(5) The product should be insoluble in common chemical solvents and reagents, such as alcohol, acetone, dilute acids, etc.

(6) The product should be as rigid as possible.

(7) The microporous structure should be dimensionally stable, i.e. the pores should not change in size with use.

The latter criterion is quite important since a major application of the microporous filters is in the filtration of microorganisms from fluids. Accordingly, when such sterile microporous filters are in use, a very high concentration of microorganisms exists at the microporous surface. Consequently, any instability of the filter and resultant increase in pore size during use could lead to disastrous consequences.

In this application and in the claims appended hereto, the terms "pore diameter," or "pore size," whether it be maximum pore diameter or size, or average pore diameter or size, is not intended to be a specific physical measurement but rather is a value calculated from the bubble point data as will be hereinafter described.

In copending application Serial No. 98,595, filed March 27, 1961, a method is proposed for impregnating or coating or both impregnating and coating a porous substrate with a particulate material in order to yield a microporous product. It has been found that under certain process conditions, coating the porous substrate rather than impregnating it yields a product having a greater permeability to fluids. The microporous coating formed has a very high voids volume, and a very small maximum pore size. The coating tightly adheres to the porous base and hence is stable in use. The microporous medium has sufficient strength and rigidity to withstand normal handling techniques.

In accordance with this invention, a process is provided for manufacturing microporous materials in the form of bats or sheets of any desired thickness having ultrafine or micropores less than 10 microns in diameter and a voids volume of at least 75 percent. The process of the invention accordingly upgrades coarse filter media such as papers and nonwoven fibrous bats to the category of microporous media by depositing thereon a layer having the desired ultrafine or microporous dimensions and voids volume.

The product of the invention is a microporous material comprising a base having bonded thereto a microporous layer whose maximum pore diameter is less than about 10 microns, and preferred embodiments have an average pore diameter from about 0.005 to 3 microns. The voids volume of the microporous layer preferably exceeds about 75%, and is frequently greater than 85%.

Filter units and elements comprising the microporous material of this invention are capable of absolutely removing from fluids particles as small as 10 microns in size, and even particles of 0.05 micron and smaller.

The microporous layer is characterized by a proportion of fibers extending outwardly from the base at an angle greater than about 30°, and by a wide spacing of fibers in the layer. The fiber spacing and angular disposition to the base throughout the entire microporous layer is noted by cross-sectional examination, upon sufficient magnification through an optical or electron microscope. This unique property of the microporous material of this invention is in large measure responsible for the high voids volume and low pore size characteristic of the products of this invention.

When fibers are laid down on a base in a conventional manner, they tend to lie almost entirely in planes parallel to the base. Such conventional fiber layers can be permeable to fluids, and can have a fairly low pore size, but they are universally characterized by low voids volumes, so that their use as filter media is not feasible. The proportion of angularly extending fibers, and the wide spacing of the fibers, both of which are characteristic of the products of this invention, serve to hold the fibers in the layer generally farther from the base, thereby increasing substantially the voids volume of the microporous layer. Since the fibers are relatively small, the interstices between them at their points of crossing will be very small, but since they are held farther apart, their interstices are fewer in number per unit volume. In consequence, the products of this invention have a very small pore size, and a high voids volume.

These figures represent the product produced in accordance with Example XII, and a detailed description thereof will be found in that example.

The invention is of particular application to porous bases formed in pleats, convolutions, or corrugations, on which the microporous layer is deposited. In such cases, the porous base can comprise a resin-impregnated cellulosic material. The microporous layer can by this process be laid on the base without bridging between adjacent pleats, convolutions or corrugations, and no shrinkage of the microporous layer occurs in use.

The process of this invention comprises applying a dispersion of particulate material to a porous base in a manner to deposit thereon a microporous layer having the desired characteristics.

In the process of the invention, fibrous material is dispersed in a fluid and deposited therefrom upon the surface of the porous base. The desired degree of microporosity of the deposited layer is obtained by varying the type, size and amount of the fibers deposited, by blending different sizes of fibers at different points, if desired, and by carefully controlling the state of dispersion of the fibers. Dispersions which are heavily flocculated tend to form coatings of high voids volume, but with poor uniformity of pore size and poor adhesion. Dispersions which are well deflocculated ("peptized dispersions") tend to form coatings of low voids volume, and hence of low permeability. The degree of flocculation yielding the desired uniformity, adhesion, and voids volume is determined for each dispersed system, using the test described herein.

Any porous material whose pores extend from surface to surface can be used as a base upon which the microporous layer is deposited. One or several layers of the same or varying porosity can be employed and can be composed of cellulose or other fibers. Paper, which can, if desired, be resin impregnated, is a preferred base material since it yields an effective, versatile and inexpensive microporous fluid-permeable medium. Where desired, other base materials can be used, such as porous sintered powders or forms of metals and of natural or synthetic plastic materials, such as aluminum, and synthetic resins and cellulose derivatives, in the form of spongy layers of any desired thickness, such as polyurethane (see Patent No. 2,961,710), polyvinyl chloride, polyethylene and polypropylene sponges and foams, woven wire products, sintered or unsintered, textile fabrics and woven and nonwoven fibrous layers of all kinds, such as felts, mats and bats, made of fibrous materials of any of the types listed below in connection with the particulate material. The porous base material will have an average pore diameter or not less than about 2.5 microns. Such materials will of course have pores as large as 20 to 25 microns, or more.

The process of the invention is applicable to fibrous material of any type, the only requirement being that the material be capable of being dispersed in a fluid, and preferably have a diameter less than about 10 microns and a length preferably not exceeding about 3500 microns. The ratio of $$\frac{\text{length}}{\text{diameter}}$$

is from about 50 to about 5000, and preferably from about 350 to 5000.

Fibrous material is preferred, because of its versatility, greater ease of deposition, and greater strength imparting properties, and because fibers can be deposited in a position at an angle to the base. A great variety of diameters of fibers are available, thus making it possible to achieve a very large assortment of mixtures of different diameter fibers for making fibrous material of any porosity, and such fibers can be made of any length, within the stated range, so as to take advantage of the greater cohesiveness of a layer of long fibers, as compared to granular material layers. Typical fibrous materials include glass, asbestos, potassium titanate, colloidal aluminum oxide ("Baymal"), aluminum silicate, mineral wool, regenerated cellulose, microcrystalline cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, metallic fibers such as iron, copper, aluminum, stainless steel, brass, Monel, silver and titanium, and clays with acicular lath-like or needle-like particles, such as the montmorillonite, sepiolite, palygorskite, and attapulgite clays of this type.

Nonfibrous particulate materials can be used in admixture with fibrous materials. However, in order to achieve the requisite microporosity and voids volume, it is essential to employ at least one part by weight of fibrous material for every three parts of nonfibrous materials. When nonfibrous particles are employed, they should have an average diameter not exceeding 10 microns. Those nonfibrous materials containing a fine internal structure or porosity are preferred.

Typical nonfibrous particulate materials are diatomaceous earth, magnesia, silica, talc, silica gel, alumina, quartz, carbon, activated carbon, clays, synthetic resins and cellulose derivatives, such as polyethylene, polyvinyl chloride, polystyrene, polypropylene, urea-formaldehyde, phenol-formaldehyde, polytetrafluoroethylene, polytrifluorochloromethylene, polymers of terephthalic acid and ethylene glycol, polyacrylonitrile, ethyl cellulose, polyamides, and cellulose acetate-propionate, and metal particles such as aluminum, silver, platinum, iron, copper, nickel, chromium and titanium and metal alloys of all kinds, such as Monel, brass, stainless steel, bronze, Inconel, cupronickel, Hastelloy, beryllium, and copper.

The fluid medium used for the dispersion is preferably inert to the particulate material and the base material. It should not dissolve a substantial amount thereof, although if the fluid is reused, the fact that some material is in solution is not a disadvantage, since a saturated solution is quickly formed ab initio. The fluid should be volatile at a reasonably elevated temperature below the melting point of the material to facilitate removal after the dispersion is deposited. However, nonvolatile fluids may be desirable under certain conditions, and those can be removed, by washing out with a volatile solvent that is a solvent for the fluid but not for the particulate material. The fluid can be the liquid to be filtered by the final product.

Typical fluids are water, alcohols, polyalkylene glycols, such as polyethylene glycols, poly 1,2-propylene glycols, and mono and di alkyl ethers thereof, such as the methyl, ethyl, butyl and propyl mono and di ethers, dialkyl esters of aliphatic dicarboxylic acids, such as di-2-ethylhexyl adipate and glutarate, mineral lubricating oils, hydraulic fluids, vegetable oils and hydrocarbon solvents such as xylene and petroleum ether, silicone fluids, chloro, bromo and fluoro hydrocarbons, such as the Freons. Since the final product is permeable to any liquid, depending upon the choice of particular material, obviously a wide selection of fluids is available, and such would be known to one skilled in this art.

The characteristics of the deposited layer desired are determined by control of several variables.

One factor is the size of the fibrous material. This can be so chosen as to be larger than, equal to, or smaller than the pore diameter of the base. Very few pores are straight through, and a smaller particle or fiber, particularly one which is acicular in shape, is likely to encounter an obstruction and lodge against the wall of the pore just below the surface of the base, blocking passage of any remaining particles and fibers. The degree of flocculation of the dispersion is an important factor in determining whether particles are retained on the surface of the base, or penetrate within the pores. If the dispersion is heavily flocculated, all the particles are retained on the surface. If the particles are well deflocculated, the particles smaller than the pores of the base will tend to enter therein, and indeed to pass through.

The degree of flocculation is important with respect to the voids volume, uniformity, and adhesive characteristics of the microporous layer as noted above. It is believed that when the degree of flocculation is within the optimum range, a plurality of fibers in the dispersion form clumps, since the fibers then tend to adhere to each other when they first touch each other, and to retain the random orientation thus acquired. The clumps then, rather than the individual fibers, are deposited on the porous base. There can also be a proportion of fibers at an angle greater than 30°, because they take this position in the dispersed clumps, and retain it after deposition because they are so supported by the other fibers. Since the fibers are joined to other fibers while still dispersed, they tend to be joined at a wider spacing than they otherwise would, thereby contributing to the unusually high voids volume of the microporous media of this invention. The extent of the need for flocculating and deflocculating agents (which are not required if the dispersion is sufficiently flocculating without them), for pH control, and for controlled agitation, to achieve the optimum state of flocculation for each particulate material and base, must be determined experimentally, by adding flocculating and deflocculating agents to the dispersion and varying the state of agitation and the pH of the dispersion, using the test described herein.

It may be advantageous to use a blend of small and large particles to assist in establishing a blockage in the pores, and obtain a suitable surface coating. However, any substantial impregnation (i.e., more than about 25 to 100 microns below the surface) of the porous base is preferably to be avoided since such penetration tends to lead to a decrease in the permeability of the porous base.

As has been stated, it is essential that the particulate material be held securely to the porous base, after application, and not pass right through or be easily dislodged by reverse pressure or mechanical abrasion subsequent to application.

In order to obtain strong adhesion between the porous base material and the particulate material deposited thereon, where the product is desired to withstand reverse flow, and mechanical abrasion, the base is preferably first treated with an anchoring dispersion comprising a liquid or liquefiable binding agent and a particulate material which is wetted by the binding agent. Thereafter the top or coating dispersion of the type described above is applied and the entire product is treated, by heating or other means, to effect adhesion of the particulate material to the porous base by the binding agent.

Fibrous materials are preferably employed in the anchoring dispersion. They should be capable of being suspended in a fluid and be capable of forming a mat, the pores of which are finer than the pores of the base whereon they are to be deposited, and preferably finer than the pores of the main microporous layer. The anchoring layer may or may not be continuous. Fibrous materials for use in the anchoring dispersion have an average diameter of from about 0.005 to 2 microns, and an average length of from about 5 to 1000 microns, and preferably an average diameter of from about 0.01 to 0.5 micron and an average length of from about 15 to 500 microns.

Nonfibrous materials can be employed in the anchoring dispersion but in such event, at least 25% by weight of a fibrous material, based upon the total weight of particulate materials, is also employed in order to retain sufficient strength, and to prevent the anchoring particles from entering the pores of the base to any significant extent. Where nonfibrous materials are employed they preferably have an average diameter of from 0.01 to 1 micron.

The fibrous and/or nonfibrous particulate materials in the anchoring dispersion should be capable of being wetted by the liquid or liquefiable binding agent employed and of remaining wetted thereby even in the presence of the dispersing liquid. This latter requirement can be generally insured by premixing the binding agent and the particulate material before adding them to the dispersing liquid.

Any of the fibrous and nonfibrous particulate materials listed above can be employed in the anchoring dispersion. In any given instance, the particulate material employed in forming the anchoring layer can be the same as or different from the particulate material employed in the coating dispersion.

The binding agent employed in the anchoring dispersion must be a liquid or capable of being liquefied at the time adhesion is to be effected, and thereafter must be capable of undergoing solidification, as by polymerization, cross-linking, evaporation of a solvent, cooling, or the like. Liquid thermosetting resins are particularly advantageous, since they are effective in low concentrations and can be maintained in liquid form until it is desired to cause them to solidify. Representative liquid thermosetting resins include phenol-formaldehyde resins, urea-formaldehyde resins, melamine-formaldehyde resins, polyester resins and polyepoxide resins.

The liquid polyepoxide resins are particularly preferred. The polyepoxides that can be used in this invention can be saturated or unsaturated, aliphatic, cycloaliphatic, aromatic of heterocyclic and may be substituted if desired with substituents, such as chlorine atoms, hydroxyl groups, ether radicals, and the like. They may also be monomeric or polymeric.

If the polyepoxide material consists of a single compound and all of the epoxy groups are intact, the epoxy equivalency will be integers, such as 2,3,4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1,4-bis(2,3-epoxypropoxy) benzene, 1,3-bis(2,3-epoxypropoxy)benzene, 4,4′-bis(2,3-epoxypropoxy)diphenyl ether, 1,8-bis(2,3-epoxypropoxy)-octane, 1,4-bis(2,3-epoxypropoxy) cyclohexane, 4,4′-bis (2-hydroxy-3,4 - epoxybutoxy)diphenyldimethylmethane, 1,3-bis(4,5-epoxypentoxy)-5-chlorobenzene, 1,4 - bis(3,4-epoxybutoxy)-2-chlorocyclohexane, 1,3-bis(2 - hydroxy-3,4-epoxybutoxy)benzene, 1,4-bis and (2-hydroxy - 4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl)-propane (Bisphenol A), 2,2-bis(4-hydroxy-phenol)-butane, 4,4′-dihydroxybenzophenone, bis(4-hydroxy-phenyl) ethane, 2,2-bis(4-hydroxy-phenyl)pentane, and 1,5 - dihydroxy-naphthalene. The halogen-containing epoxides may be further exemplified by 3-chloro - 1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula wherein R represents a divalent hydrocarbon radical of the dihydric phenol. The polymeric products will generally not be a single simple molecule but will be a complex mixture of glycidyl polyethers of the general formula wherein R is a divalent hydrocarbon radical of the dihydric phenol, n is an integer of the series 0, 1, 2, 3, etc. While for any single molecule of the polyether n is an integer, the fact that the obtained polyether is a mixture of compounds causes the determined value for n to be an average which is not necessarily zero or a whole number. The polyethers may in some cases contain a very small amount of material with one or both of the terminal glycidyl radicals in hydrated form.

The preferred glycidyl polyethers of the dihydric phenols may be prepared by reacting the required proportions of the dihydric phenol such as Bisphenol A and the epichlorohydrin in an alkaline medium. The desired alkalinity is obtained by adding a basic substance, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Any known type of curing agent can be employed in conjunction with the polyepoxide resins employed in this invention. For example, organic amines and quaternary ammonium compounds as in Patent No. 2,506,486, acidic organic orthophosphates as in Patent No. 2,541,027, sulfonic acid or sulfonyl halides as in Patent No. 2,643,243 and acid anhydrides either alone or with activators as in Patent No. 2,768,153. The organic amines are particularly preferred since they give the fastest rate of solidification. Aliphatic amines such as dimethylamine, trimethylamine, triethylamine, 1,3-diaminopropane, hexamethylene diamine, diethylene triamine, triethylene tetramine, octylamine, decylamine, dioctylamine, and dodecylamine are exemplary of primary, secondary and tertiary aliphatic amines. The aliphatic amines preferably have from one to twelve carbon atoms. Also useful are the aromatic amines such as phenylene diamine, di(methylaminomethyl)phenol, tri(dimethylaminomethyl)phenol, and diethylaniline.

The acid anhydrides are also quite useful as curing agents. These compounds are derived from mono or preferably, polycarboxylic acids, and possess at least one anhydride group.

Z represents the carboxylic acid residue, and may be a saturated or unsaturated aliphatic, cycloaliphatic, aromatic or heterocyclic group. Exemplary are phthalic anhydride, maleic anhydride, "Nadic" methyl anhydride, succinic anhydride, chlorosuccinic anhydride, 6-ethyl-4-cyclo-hexadiene-1,2-dicarboxylic acid anhydride, dodecenyl succinic acid anhydride, tetrahydrophthalic acid anhydride, pyromellitic dianhydride, and the like. Other anhydrides which can be used will be found mentioned in U.S. Patent No. 2,768,153.

Also applicable as binding agents for use in this invention are solutions of solid thermosetting resins in suitable solvents.

Thermoplastic solid binders can also be employed as long as they can be softened to a tacky state, or liquefied, as by heating to above their softening point, to effect adhesion. Such thermoplastic materials can be employed alone or in solution in a suitable solvent. Typical thermoplastic binders include polyethylene, polypropylene, polymethylene, polyisobutylene, polyamides, cellulose acetate, ethyl cellulose, copolymers of vinyl chloride and vinyl acetate, polyvinyl chloride, polyvinylidene chloride, polyvinyl butyral, polytetrafluoroethylene, polytrifluorochloroethylene, lignin-sulfonate resins, starch binders, casein binders, and terpene resins, polyacrylic resins, such as polymethyl methacrylate, alkyd resins, and synthetic rubbers such as butadiene-styrene polymers.

The dispersing fluid used in preparing the anchoring dispersion can be any fluid which is inert under the conditions of use such as any of the fluids referred to above.

In preparing the anchoring dispersion, the binding agent is preferably mixed with the particulate material and the mixture is then added to the dispersing liquid with agitation, to create a stable dispersion. When the particulate material is prewetted with the binding agent in this manner, the droplet size of the final dispersion is coarser than when the particulate material and the binding agent are added separately to the dispersing fluid. To stabilize this coarser dispersion, it is preferred that the final anchoring dispersion have a viscosity in excess of about 400 centipoises at 25° C. If the particulate dispersing fluid does not have a sufficiently high viscosity to achieve this, the viscosity of the dispersion can be increased by the addition of any of the well known soluble high molecular weight materials which have the ability to substantially increase the viscosity of fluids even when present in very small quantities. Soluble cellulose derivatives are particularly useful when the dispersing fluid is water. The addition to water of less than 2% by weight of soluble, high molecular weight hydroxyethyl cellulose, soluble sodium carboxymethyl cellulose or soluble hydroxypropyl methyl cellulose, for example, has the effect of raising the viscosity of the water to well above the specified minimum even in the absence of the particulate material and the binder.

An alternative method of preparing the anchoring dispersion which can be used to insure that the particulate material will be sufficiently wetted by the binding agent involves the use of a binding agent dissolved in a suitable solvent. The binding agent is insoluble in the dispersing fluid while the solvent is soluble therein. The particulate material and the binding agent solution which can be premixed if desired, either in whole or in part, are added to the dispersing fluid. The solvent dissolves in the dispersing fluid causing the precipitation of the binding agent on the fibrous material. The viscosity of the fluid dispersion is sufficient to prevent any of the binding agent or particulate material from settling out before application to the porous base.

In this alternative method of preparing the anchoring dispersion, there is preferably present in the dispersion both a fibrous and a nonfibrous particulate material. The nonfibrous material preferably has an average particle size of about 0.005 to 2 times the average diameter of the fibrous material. The solvent employed can be any solvent for the particular binding agent employed that is soluble to the extent of at least 1% by weight in the dispersing fluid either at room temperature or at an elevated temperature. For example, where the binding agent is polyepoxide and the dispersing fluid is water, suitable solvents that can be employed include butyl acetate, butyl carbitol, methyl ethyl ketone and furfuryl alcohol.

Where the particulate material is preferentially wetted by the binding agent rather than by the dispersing fluid, the order of mixing the components in forming the anchoring dispersion is less important.

The anchoring dispersion should preferably contain from about 0.1 to 5 parts by weight of particulate material per 100 parts by weight of dispersing liquid and from 8 to 2000 parts by weight of binding agent per 100 parts by weight of particulate material, preferably at least about 200 parts of binding agent per 100 parts of particulate material.

Sufficient anchoring dispersion should be applied to the porous base to deposit from about 5 to 50 grams of binding agent per square foot of surface area of the porous base. The anchoring layer need not be a continuous layer. After the anchoring dispersion had been applied to the porous base, the coating dispersion can be applied.

The pore size and voids volume of any microporous layer laid down on the anchoring layer is determined by the fiber length and diameter and the state of suspension of the fibers in the coating dispersion. The state of suspension required for forming a layer of the desired pore size and voids volume for a given fiber or fiber mixture is determined by trial and error, and the parameters required to duplicate the successful experiment determined by a few simple measurements.

The state of suspension of the dispersion determined to be desirable is measured by the degree of flocculation thereof by titration with a solution capable of flocculating the dispersion such as magnesium sulfate or aluminum sulfate solution, for fiber dispersions having a pH above about 7, or sodium carbonate or sodium hydroxide solution for fiber dispersions having a pH below 7. The fiber dispersion in the test solution suitably can have a fiber concentration of 1 g./l., and the titrating solution a concentration of 5% of the active agent. The extent of flocculation effected by this flocculant is measured by observation of the turbidity of the dispersion, such as by a colorimeter, during the titration. A dispersion of this turbidity is then known to have the correct flocculating properties, or state of suspension, and succeeding dispersions can be made to this turbidity. Any desired flocculating property can be prepared by addition of the appropriate amount of dispersant or flocculating agent, to make the dispersion more or less flocculating, as the amount of titrating solution in the test may indicate, to give the required turbidity.

In order to make the anchoring and/or coating dispersion less flocculating, a dispersing agent can be added to either or both of the dispersions, although this is not essential. Any dispersing agent known to disperse the particulate material used can be employed. The dispersing agent should also wet the porous base. These can be of the type used in the paper-making trade, such as the alkali metal polyphosphates, for example, sodium hexametaphosphate, sodium pyrophosphate, and sodium metasilicate, pentasodium tripolyphosphate, and sodium metaphosphate, as well as any synthetic surfactant or organic emulsifier, such as are described in Schwartz and Perry, "Surface Active Agents."

In order to make an anchoring or coating dispersion more flocculating, a flocculating agent can be added. This can be of the type used in the paper-making trade.

Exemplary dispersing and flocculating conditions for several common fibers are as follows:

CONDITIONS

| Fiber | For Dispersion | For Flocculation |
|---|---|---|
| Amosite type amphibole asbestos. | Add Tamol 350 (a water soluble sodium salt of polyacrylic acid). | Add an excess of sodium carbonate. |
| Crocidolite type amphibole asbestos. | Add Tamol 850 | Do. |
| Chrysotile asbestos | Add Tamol 850 or sodium hexametaphosphate. | Do. |
| Glass | Maintain pH at about 3 | Increase or decrease pH from 3. |
| Potassium titanate | Add a dispersing agent prepared by mixing 53.4 parts of mixed ammonium and ethanolamine salts of alkyl sulfuric acids derived by sulfation of the alcohols obtained by reducing coconut oil, 15 parts of the monoalkylolamide of coconut oil fatty acids and monoethanolamine, 2 parts of electrolyte (chloride and sulfate of monoethanolamine), 24 parts of ethanol and 5 parts of water. | No special conditions needed. |

The flocculating agent can be added to the dispersion after the desired amount of material has been applied to the porous base to effect deposition. It also can be applied to the base before the dispersion to ensure deposition as soon as it blends with the slurry. In a case of this type, it is preferred that the slurry be on the verge of instability and deposition, so that flocculation and deposition promptly follows blending with even small amounts of flocculating agent.

Some particulate materials tend to flocculate others, due to, for example, a difference in charge on the particles. For example, potassium titanate fibers are flocculants for asbestos fibers. Addition of the former to the latter therefore results in flocculation.

The amount and location of deposited particles also can be controlled by control of deposition through a varying of the size of particulate material introduced, or by the amount of agitation applied to the slurry during deposition.

A coating dispersion which tends to flocculate in a quiescent suspension can be dispersed by agitation. As soon as agitation ceases, as upon application to the base, the instability of the slurry results in deposition. Thus, such a dispersion can be applied through a moving apertured plate held closely to the porous material, so that turbulence produces a fine dispersion that settles out after application when agitation is less or nonexistent.

To obtain the highest flow rate or permeability, the amount and depth, if any, of impregnation of the porous base should be as little as possible. Greater penetration of the porous base than to a depth as small as two to three fiber diameters or about 100μ should be avoided in order to prevent reduction in flow rate through the porous base. As noted above, flow rate varies directly with the ratio of voids to fiber volume, i.e., the percentage of voids present. The presence of the anchoring layer tends to substantially prevent any impregnation of the base and hence any reduction in the voids volume of the porous base, and thus leads to an increase in this ratio and hence in the flow rate.

The amount of dispersing agent and flocculating agent, if used, should be selected with care, since if too much dispersant is used, the particulate material will pass right through the porous material, whereas if too much of the flocculating agent is used, the dispersion is unstable, and the particulate material will not form a suitable coating. However, the relative amounts are readily determined by trial and error in each case, in relation to the particles, their size, the temperature of deposition, the hardness of the water, the solids content of the dispersion, and the pore opening of the base. Usually, from 0.001 to 5% of dispersant and from 0.001 to 5% of flocculant are satisfactory. These can be used separately as described, or together in the slurry in amounts to give a dispersion until deposition.

A wetting agent which wets the material can also be incorporated in either or both of the dispersions. If a dispersing agent is used, this should also serve as a wetting agent for the base, and therefore should not only disperse the particulate material but should also wet the base material. If no dispersing agent is used, a wetting agent may be desirable. Potassium titanate, for example, does not always require a dispersing agent to form a sufficiently stable slurry in water, but a wetting agent may be required to obtain adhesion to certain bases, such as paper, glass, wool and synthetic resins.

From 0.001 to 5% of a wetting agent is usually sufficient. Anionic, nonionic and cationic wetting agents can be used.

Any method of applying the dispersions to the porous base which causes the dispersing fluid to flow through the base may be used. For example, the dispersion may be subjected to a differential pressure by applying a direct pressure to it or by applying a vacuum to the underside of the base. Once deposited, the anchoring layer helps to prevent solids in the coating dispersion from passing through.

The compression and hence bulk density of the microporous layer can be varied by varying the differential pressure across the layer during deposition. The differential pressure is in turn dependent upon fluid velocity and viscosity, and the permeability of the porous base. For a given differential pressure, the layer density can be decreased by including a small amount of bulked or crimped coarse particles which can support the finer particles, and space them better.

Under certain circumstances, it is desirable that shrinkage during drying of the microporous layer be minimized, for example, to prevent the warping of the composite sheet; or when the coating is applied to paper which has been pleated, to prevent the applied layer from pulling away from the roots of the corrugations. Shrinkage can be minimized by applying the coating dispersion to the base in several applications, for example, in from two to six applications, while removing the element from the suspension between each application, and applying a differential pressure of up to about 100 p.s.i. Greater pressures are preferably avoided before solidification of the binding agent in order to prevent any possible reorientation of the angularly oriented fibers. The liquid binding agent, if any, contained in the coating dispersion can, if desired, be caused to solidify between the several applications of the dispersion. Alternatively, solidification can be effected after complete application.

When particulate materials are deposited on a porous base, tortuous passages of varying sizes exist between the particles. These passages in the aggregate have a mean pore size which determines the effective diameter of the microporous layer, and which depends on:

(1) The dimensions (diameter or diameter and length) of the particles.
(2) The shape of the particles.
(3) The internal structure of the particles (as for example, when diatomite particles are used).
(4) The average distance between adjacent particles.
(5) The state of aggregation and uniformity of spacing of the particles.

Fine and coarse particles, such as fibers, may be combined and blended to produce a layer having an intermediate mean pore diameter dependent on the proportions of the particles. Different sizes of particles can be deposited in different regions of the microporous layer thus producing a gradation in pore size.

A binding agent can be and preferably is used in conjunction with the main microporous layer. The binding agent can be flowed through the coated base as a final operation or any of the binding agents mentioned above can be added to the coating dispersion before it is applied to the base. The binding agent can also be incorporated in the microporous layer after deposition, if it has a deleterious effect upon the dispersion. It can for example be washed through the layer after the fluid has been drawn off, or it can be deposited on the surface of the microporous layer, whence it will spread by capillarity throughout all the layers.

After the application has been completed, adhesion is effected. The conditions necessary to accomplish this vary with the nature of the binding agent. For example, the temperature can be raised to a point high enough to cause the cross linking or polymerization of the binding agent or to cause the evaporation of the solvent in which the binding agent is dissolved. Alternatively, where a thermoplastic material is used as the binding agent the temperature can be increased to effect softening or fusion. A catalyzed resin can be allowed to stand at room temperature until the resin is set.

If it is necessary to raise the temperature of the coated product to cure or soften the binder, a curing oven can be provided, through which the base is passed after the deposition. The coated base can also be dried in this oven, if desired, to remove any remaining portion of the dispersing fluid. Alternatively, the binding agent can be caused to solidify by passing heated air or other heated gases through the coated product.

The adhesion obtained between the microporous layer and the porous base by means of this invention is quite high. As a result, the strength of the final product is dependent primarily upon the strength of the porous base. A convenient and meaningful method of measuring the adhesion developed in the final microporous product between the microporous layer and the porous base is to form the microporous product into a flat sheet having a surface area of $\frac{1}{20}$ square foot, the microporous layer being on the upper surface. The sheet is clamped in a device which permits fluid to be held on the upper surface while the lower side is connected to a source of air pressure. The fluid which is in contact wtih the upper surface is one with which it is wetted, as for example, water or alcohol. Air is then gradually admitted to the lower side, a pressure gauge being employed to measure the buildup of pressure. Ultimately the pressure exerted by the air becomes too great and causes the microporous layer to rupture. This is easily observable by the increased bubbling of the liquid immersion medium. The maximum air pressure achieved before rupture is a measure of the adhesion.

When the average pore diameter of the microporous layer exceeds 0.3 micron, the differential pressure of the medium at the flow rate through the medium at rupture should be calculated and this differential pressure subtracted from the total pressure at rupture to yield the actual pressure causing rupture. At pore diameters below 0.3 micron, the differential pressure can safely be disregarded. A satisfactory microporous material should be capable of withstanding a pressure greater than about 3.5 p.s.i. Below this value, the adhesion is insufficient for a great many industrial applications. Preferably the microporous material should be capable of withstanding at least 6 p.s.i.

The voids volume of the microporous layer is determined by applying the layer in accordance with the teaching of this invention to a paper or other porous disc of known weight and thickness. The weight of the microporous layer is then determined by the difference in weight. The apparent volume of the microporous material is determined by measurement of the area and thickness of the layer. The true volume is determined by fluid displacement techniques using a fluid capable of wetting all of the components of the product. The voids volume is then determined by the following equation:

$$\text{Voids volume} = 100 \times \left[1 - \frac{\text{true volume of layer}}{\text{apparent volume of layer}}\right]$$

Calculated by this method, the microporous materials produced by means of this invention preferably have microporous layers with voids volumes of at least 75% and in some instances 90% and even higher.

The pore size or diameter of the microporous materials of this invention was evaluated by the following test which is substantially in accordance with the procedure of U.S. Patent No. 3,007,334.

A disc of the material to be tested is wetted with a fluid, preferably ethyl alcohol, capable of wetting the microporous layer, and clamped between rubber gaskets. A fine screen is positioned above the disc supporting it against upward movement. The volume above the disc is filled with the fluid. Air pressure is increased in the chamber below the disc until a stream of air bubbles is observed emerging from one point of the test piece. The effective pore diameter is then calculated by the well-known formula:

$$\text{pore diameter (microns)} = \frac{K}{\text{pressure (inches of water)}}$$

K is determined by measuring the maximum spherical glass bead or carbonyl iron particle which passes through the element, in accordance with WADC Technical Report 26-249 and MIL-F-8815 (ASG) paragraphs 4, 7, 8 (March 18, 1960), or the largest bacteria which passes through.

This formula is discussed in WADC Technical Report 56-249, dated May 1956, entitled "Development of Filters for 400° F. and 600° F. Aircraft Hydraulic Systems" by David B. Pall, and available from the ASTIA Document Service Center, Knott Building, Dayton 2, Ohio. A detailed description of the bubble point test and determination of pore size from the maximum particle passed will be found in Appendix I of this report. See also U.S. Patent No. 3,007,334, dated November 7, 1961, to David B. Pall.

The pore diameter obtained by this method is the maximum pore diameter. By continuing to increase air pressure until the whole surface of the filter medium is bubbling (known as the "open bubble point") the same constant can be used to compute an average diameter characteristic of most of the pores. Tests have shown that if air is passed at a velocity of 70 to 170 cm./min., the pressure necessary to achieve the open bubble point taken together with the K value given above gives a value for the pore opening approximating the true average value. The ratio between the maximum pore size and the average pore size of the microporous media of this invention generally ranges from about 2:1 to about 4:1, a relatively small difference which greatly increases the safety and reliability of the product.

The following examples in the opinion of the inventors represent preferred embodiments of the invention.

*Example I*

An anchoring dispersion was prepared by mixing 20 grams of a liquid binding agent comprised of a liquid polyepoxide resin (p-aminophenylethyl chlorohydrin) containing 30% by weight of a cyanoethylated primary aliphatic polyamine as a curing agent, 2 grams of butyl carbitol as a thinner for the resin and 2 grams of potassium titanate fibers averaging 0.5 micron in diameter and 50 microns in length, and dispersing the mixture in 600 cc. of water containing 0.5% by weight of hydroxypropyl methyl cellulose. The resultant dispersion had a viscosity in excess of 500 centipoises and had an average droplet size of between 50 and 100 microns.

A coating dispersion was prepared by mixing 6 grams of amosite type amphibole asbestos fibers 0.5 micron by 200 microns, 6 grams of the same binding agent that was used in the anchoring dispersion, 60 grams of butyl carbitol, 12 grams of sodium carbonate, and 0.6 gram of Tamol 850, a water soluble organic dispersing agent, and dispersing the mixture in 6 liters of water. The resultant dispersion was an emulsion having an average droplet size of 1 to 2 microns.

The anchoring dispersion was then flowed through a paper base measuring one square foot in surface area and having an average pore size of 10 microns by applying a vacuum of 15 inches of mercury on the underside of the base. Thereafter, the coating dispersion was flowed through the base in the same manner and the base was then heated in an air oven at 375° F. for 40 minutes.

The resulting microporous material had a maximum pore diameter of 7.5 microns, an average pore diameter of 3 microns, and a water permeability of 1.5 gallons per minute per square foot at an applied pressure differential of 1 pound per square inch. When pressure was applied in the reverse direction, it was found that the adhesion between the particulate materials and the paper base was sufficient to withstand the application of up to 10 p.s.i. The voids volume of the microporous layer was found to be about 90%. Microscopic inspection of the surface of the microporous layer showed a proportion of fibers extending outwardly from the base at an angle of at least 30°.

*Example II*

The procedure of Example I was repeated using methyl ethyl ketone in place of butyl carbitol, and chrysotile asbestos fibers averaging 0.01 micron by 50 microns, in place of both the potassium titanate fibers and the amphibole asbestos fibers. 0.24 gram of sodium carbonate and 0.03 gram of a water soluble organic dispersing agent were also added to the anchoring dispersion only. The coating dispersion was applied in four approximately equal increments with air at a differential pressure of 60 p.s.i. being passed through after each application of an increment. The resulting product had an average port diameter of 0.02 micron, a maximum pore diameter of 0.05 micron, a water permeability of 0.03 gallon per minute per square foot at a 1 p.s.i. applied pressure differential, and a voids content in the microporous layer of about 90%. The adhesion was found to be sufficient to withstand the application of 12 p.s.i. applied in the reverse direction. Examination revealed the presence of a proportion of fibers extending outwardly from the base at an angle of at least 30°.

*Example III*

The procedure of Example I was repeated using in place of the potassium titanate fibers, 0.2 gram of chrysotile asbestos shorts having an average size of 0.01 micron by 50 microns and 1.8 grams of diatomaceous earth having an average particle size of 0.5 to 5 microns. 0.3 gram of sodium carbonate and 0.05 gram of a water soluble organic dispersing agent were also added to the anchoring dispersion.

The resultant product had an average pore diameter of 3 microns, a maximum pore diameter of 7.5 microns, a water permeability of 1.5 gallons per minute per square foot at 1 p.s.i. applied pressure differential, and an adhesion capable of withstanding the application of 11 p.s.i. in the reverse direction. The voids volume of the microporous layer was in excess of 85%. The outwardly extending fibers were also noted upon examination.

*Example IV*

An anchoring dispersion was prepared by mixing 20 grams of a solid polyepoxide resin made by reacting Bisphenol A with epichlorohydrin in an alkaline solution having a melting point of 125–135° C., a viscosity in a 40% weight solution in butyl carbitol at 25° C. of 18 to 28 poises, an an epoxide equivalent of 2000–2500, and containing 25% by weight of m-phenylene diamine as a curing agent, 60 grams of butyl carbitol, 400 mg. of silica having an average particle size of 0.02 micron and 80 mg. of a 10% aqueous solution of a surfactant mixture consisting of potassium oleate and sodium di-octyl sulfosuccinate. The resulting mixture, which was an emulsion having an average particle size of 1 to 5 microns, was then added to 2 liters of water in which was dispersed 2 grams of chrysotile asbestos, averaging 0.01 by 50 microns, 0.8 gram of sodium carbonate and 0.1 gram of Tamol 850.

A coating dispersion was prepared by first forming an emulsion between 12 grams of the same polyepoxide resin, 6 grams of butyl carbitol and 1 gram of the surfactant. This emulsion, which had an average droplet size of 1 to 2 microns, was added to 6 liters of water containing 6 grams of the same chrysotile asbestos. The two dispersions prepared in this manner were then successively applied by flowing through a paper base having an average pore size of 10 microns and a surface area of 1 square foot.

The anchoring dispersion was applied at the differential pressure caused by applying a vacuum to the base equivalent to 15 inches of mercury and the coating dispersion was applied in four increments under a differential pressure of 60 p.s.i. with air at 60 p.s.i passed through between each increment. Thereafter, hot air was passed through the base, for 3 minutes, the air being at a temperature of 650° F. and a velocity of 5 cubic feet per minute per square foot. The resultant microporous product was found to have an average pore diameter of 0.02 micron, a maximum pore diameter of 0.8 micron, a water permeability of 0.01 gallon per minute per square foot at 1 p.s.i. applied pressure differential. It was also found to have an adhesion sufficient to withstand the application of 5 p.s.i. in the reverse direction. The voids volume of the microporous layer was in excess of 85%. The outwardly extending fibers were observed on examination.

*Example V*

The procedure of Example IV was repeated except that crocidolite type amphibole asbestos, averaging 0.1 by 30 microns, was substituted for chrysotile asbestos in both dispersions, colloidal alumina having an average particle size of 0.03 micron was substituted for the silica, and 4 grams of sodium carbonate and 2 grams of the soluble organic surface active agent were employed.

The anchoring dispersion was applied at a 14 p.s.i. pressure differential and the coating dispersion was applied in 4 increments at a pressure differential of 40 p.s.i. The resultant product had an average pore diameter of 0.15 micron, a maximum pore diameter of 0.30 micron, a water permeability of 0.6 gallon per minute per square foot at 1 p.s.i. applied pressure differential and adhesion capable of withstanding the application of an applied pressure of 4 p.s.i. in the reverse direction. The voids volume of the microporous layer was found to be about 90%. A proportion of outwardly extending fibers was observed on microscopic examination of the microporous layer.

*Example VI*

An anchoring dispersion was prepared by first forming an emulsion containing 24 grams of the polyepoxide resin used in Example I, 170 grams of butyl carbitol, and 6 grams of silica having an average particle size of 0.03 micron. This emulsion which had an average droplet size of 1 to 5 microns, was then added to a second emulsion having an average droplet size of 1 to 2 microns and consisting of 12 grams of the polyepoxide resin, 30 grams of trichloroethylene and 4 grams of a 10% aqueous solution of a surfactant mixture consisting of potassium oleate, sodium octyl sulfosuccinate and nonyl phenoxypolyoxyethylene ethanol. The resultant mixture was added to 2 liters of water having dispersed therein 2 grams of amosite type amphibole asbestos, averaging 0.5 by 200 microns, 1 gram of sodium carbonate and 0.2 gram of an organic water soluble surface active agent.

A coating dispersion was prepared consisting of 6 liters of water, 6 grams of amosite type amphibole asbestos, 27 grams of the polyepoxide resin, 125 grams of butyl carbitol, 20 grams of trichloroethylene, and 3 grams of the aqueous surfactant solution.

The anchoring dispersion was then flowed through a paper substrate having a surface area of 1 square foot and an average pore size of 25 microns by applying a vacuum equal to 15 inches of mercury to the base. Thereafter, the coating dispersion was applied in three separate applications, with the application of air at a differential pressure of 40 p.s.i. between increments. Hot air was then passed through the coated base for 3 minutes, the air having a temperature of 650° F. and a velocity of 5 cubic feet per minute per square foot. The resultant microporous product had an average pore diameter of 2 microns, a maximum pore diameter of 7.5 microns, a water permeability of 0.5 gallon per minute per square foot at a 1 p.s.i. applied pressure differential and an adhesion sufficient to withstand the application of 5 p.s.i. in the reverse direction. The voids volume of the microporous layer was found to be about 90%. The outwardly extending fibers were observed on microscopic examination.

*Example VII*

An anchoring dispersion was prepared by mixing 30 grams of the same polyepoxide resin used in Example IV, 40 grams of trichloroethylene and 4 grams of potassium oleate. This mixture was added to 1 liter of water and thereafter 10 grams of glass fibers, averaging 9 microns in diameter by 1000 microns long, were added.

A coating dispersion was then prepared by mixing 6 grams of the same polyepoxide resin, 2 grams of the same amine, 12 grams of furfuryl alcohol (a reactive diluent for the resin also serving as a partial curing agent), 12 grams of butyl carbitol as a non-reactive diluent, 3 grams of an emulsifying agent (a polyethoxylated fatty acid mixture having acyl radicals derived from rosin acids and having a molecular weight of about 700). This mixture was then added to a dispersion containing 4 grams of glass fibers averaging 0.2 micron by 300 microns, dispersed in 2 liters of water having a pH of 3, the pH having been adjusted with hydrochloric acid. The resultant emulsion had a droplet size of 3 microns.

The anchoring dispersion was then applied by passing it through the base at a pressure differential caused by the application of a vacuum equivalent to 15 inches of mercury. The coating dispersion was then applied in two increments at a differential pressure of 40 p.s.i. The base was a paper substrate having a surface area of one square foot and an average pore size of 10 microns. Therefore, the product was treated by passing hot air through it at a temperature of 650° F. at a rate of 5 cubic feet per minute per square foot for 3 minutes. The final product had a water permeability of 2 gallons per minute per square foot at 1 p.s.i. applied pressure differential, an average pore diameter of 2 microns, a maximum pore diameter of 5 microns and an adhesion sufficient to withstand the application of 6 p.s.i. in the reverse direction. The microporous layer had a voids volume in excess of 85%. The outwardly extending fibers were noted when the microporous layer was examined through a microscope.

*Example VIII*

The procedure of Example VII was repeated, using as the substrate, one square foot of a cotton fabric weighing 1 ounce per square foot. The anchoring dispersion was applied at a differential pressure of 14 p.s.i. and the coating dispersion was applied in two increments at a differential pressure of 60 p.s.i. The final product showed a water permeability of 2.3 gallons per minute per square foot at 1 p.s.i. applied pressure differential, an average pore diameter of 2 microns, a maximum pore diameter of 5 microns, and an adhesion sufficient to withstand the application of 4 p.s.i. in the reverse direction. The voids content of the microporous layer was in excess of 85%. The outwardly extending fibers were noted on microscopic examination.

*Example IX*

The procedure of Example VII was repeated using in the coating dispersion, glass fibers averaging 0.1 micron by 200 microns. Both dispersions were applied at a pressure differential of 14 p.s.i. The final product has a water permeability of 0.9 gallons per minute per square foot at 1 p.s.i. applied pressure differential, an average pore diameter of 0.8 micron, a maximum pore diameter of 3.5 microns, and an adhesion sufficient to withstand the application of 6 p.s.i. in the reverse direction. The voids volume of the microporous layer was in excess of 85%. The outwardly extending fibers were observed on microscopic examination.

*Example X*

The procedure of Example I was repeated except that in the coating dispersion, 6 grams of an emulsion of 60 grams of polyvinyl acetate in 60 grams of water having a 2 micron average droplet size was substituted for the epoxy resin, the polyamine and the butyl carbitol. The final product was heated at 350° F. for 15 minutes in an air oven and thereafter showed a water permeability of 1.9 gallons per minute per square foot at 1 p.s.i. applied pressure differential, an average pore diameter of 3 microns, a maximum pore diameter of 7.5 microns, and an adhesion sufficient to withstand the application of 5 p.s.i. in the reverse direction. The voids volume of the microporous layer was in excess of 85% and the outwardly extending fibers were observed on microscopic examination.

*Example XI*

A cylindrical axially pleated filter element was prepared from an epoxy resin impregnated paper having an average pore diameter greater than 10 microns. The element was 5.5 inches long and had an internal diameter of 1 inch and an external diameter of 2 inches. 30 pleats gave an outer surface area of 144 square inches. The element was supported by an internal wire spring 5.5 inches long and having an outer diameter of 1 inch. The two ends of the element were then placed in a clamp and sealed by means of silicone rubber gaskets, one of the gaskets having an opening communicating with the interior of the element and an effluent outlet port to permit drainage of fluids contained in the interior of the element. The element so prepared was then placed in a vessel containing the anchoring dispersion of Example I. Vacuum equivalent to 15 inches of mercury was then applied through the effluent outlet port to draw the dispersion through and cause the deposition of the particulate material and binding agent on the external surface of the element.

The coating dispersion of Example I was then drawn through in four separate applications, each application being equal to approximately 25% of the total applied and at an applied vacuum equal to 14 p.s.i. After each application, the element was removed from the pressure vessel and was subjected to an air pressure of 10 p.s.i. from the outside to compress the materials thus far applied.

After all of the coating dispersion had been applied, hot air at a temperature of 650° F. was passed through for five minutes from the outside to the inside to dry the element and cure the resin. The element was then removed from between the clamps and metal end caps were affixed by means of a suitable adhesive.

The filter element thus prepared was found to have a maximum pore diameter of 7.5 microns, an average pore diameter of 3 microns, a water permeability of 0.8 gallon per minute per square foot at an applied pressure differential of 1 p.s.i. The adhesion was sufficient to withstand the application of up to 10 p.s.i. in the reverse direction, and the voids volume of the microporous layer was about 90%. Upon microscopic examination of the surface of the element a proportion of fibers extending outwardly from the base at an angle of 30° was observed.

*Example XII*

Figure 1:
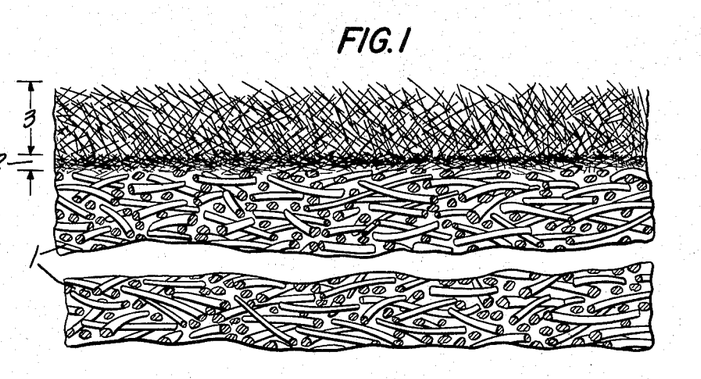
FIGURE 1 represents a cross-sectional view through a microporous material of the invention, showing the fibers extending at an angle greater than about 30°, and the high voids volume due to the wide spacing of the fibers.
Figure 2:
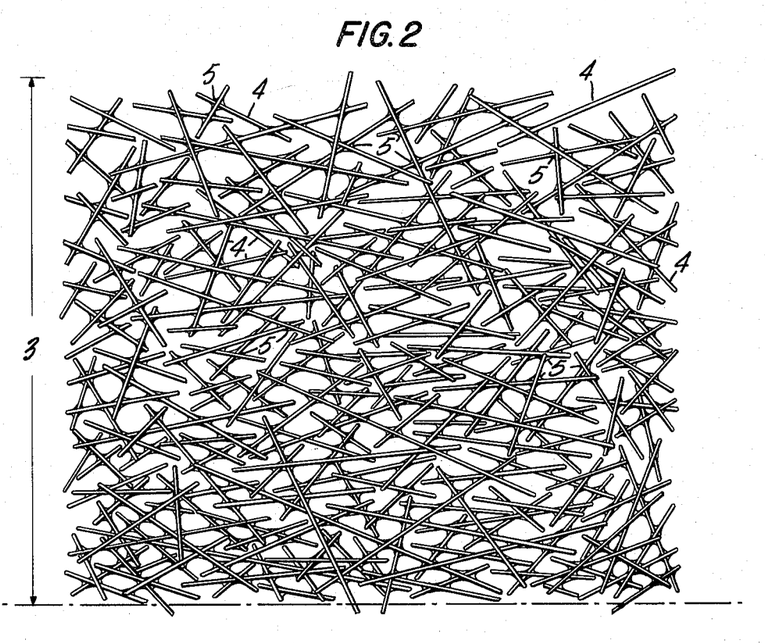
FIGURE 2 is a greatly magnified view of a portion of the upper surface of the microporous material of FIGURE 1.

The procedure of Example XI was repeated except that crocidolite type amphibole asbestos averaging 0.1 by 30 microns was used in place of the amosite type in the coating dispersion and in addition, 4 grams of sodium carbonate and 2 grams of a soluble organic surface active agent were added to the coating dispersion. The differential pressure of the air applied between increments was 50 p.s.i. The resulting product had a maximum pore diameter of 0.35 micron, an average pore diameter of 0.15 micron, and a water permeability of 0.25 gallon per minute per square foot at an applied pressure differential of 1 p.s.i. The adhesion was sufficient to withstand the application of up to 6 p.s.i. in the reverse direction and the voids volume of the microporous layer was about 85%. The outwardly extending fibers were observed on microscopic examination. FIGURE 1 is a view on a greatly magnified scale of a cross section through a very small portion of the filter element produced in accordance with this example, showing a portion of the paper base 1, the anchoring layer 2 and the microporous layer 3. The outwardly extending fibers 4 at an angle to the base of at least 30° are more easily observed in FIGURE 2. The resin binder 5 is lodged at the points of crossing of the fibers, holding them in place. FIGURE 2 also shows that the outwardly extending fibers 4 are present throughout the microporous layer and not only at the surface.

The fibers through the flocculation tend to cling to one another during deposition at their crossing points in the positions shown, the crossing points being spaced apart at relatively great distances. In this respect, the structure differs from conventional laid down mats, where the fibers are not held at spaced positions by flocculation, but are laid down and assume positions controlled merely by fluid pressure. The result is that the fibers are pulled down in such a way as to be parallel to the base, or nearly so. By flocculation, however, fibers normally tending to be flat are held together by the clinging action, and a substantial proportion can and do assume positions at an angle of 30° or more to the base, in which positions they are permanently held in the final structure by the binder 5, thereby establishing the large voids volume characteristic of the products of this invention. The pore diameter of the interstices is nonetheless of microscopic dimensions.

Figure 3:
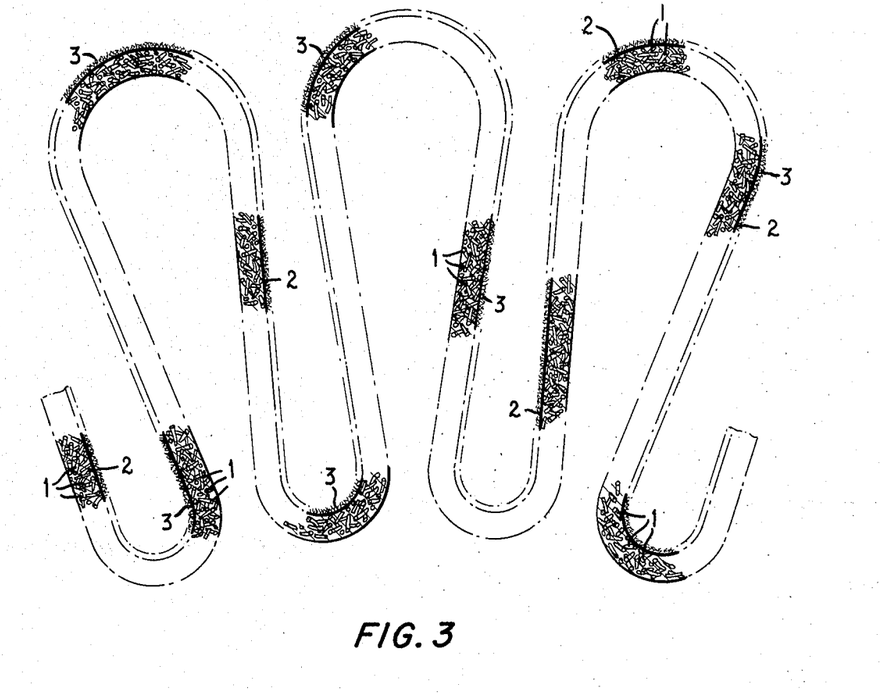
FIGURE 3 is an enlarged cross-sectional view, with portions broken away, of a filter of the invention in corrugated form.

FIGURE 3 shows a portion of a corrugated filter including several of the pleats or corrugations, with portions partly broken away and shown in cross-section, showing the fibers of the substrate 1, the anchoring layer 2, and the fibers of the outer microporous layer 3. This filter sheet material is the same as that shown in FIGURES 1 and 2, but formed in corrugations.

The cross-sectional portions are taken at the external and internal bends, as well as at the substantially straight portions between the bends. As shown, the anchoring layer 2 and the microporous layer 3 are of uniform thickness over the entire surface of the filter.

The microporous media of this invention are of course useful as filter media for the removal of suspended solids from fluids as well as for the removal of bacteria and other microorganisms. They are also useful as semipermeable membranes for gases and liquids. They can be used for the oxygenation of blood and for dialysis membranes and in closed cycle ecological systems, among a great variety of possible applications.

We claim:

1. A process for preparing microporous fluid-permeable media which comprises flowing through and depositing on to a porous base an anchoring dispersion comprising particulate fibrous material, a binding agent and a dispersing liquid, the binding agent being present in an amount of at least 8 parts by weight per 100 parts by weight of particulate material, and then a coating dispersion comprising a dispersing liquid and particulate fibrous material, the ratio of fiber length and diameter of the fibrous material to the pore size of the base being selected to restrict impregnation of the base to a depth of at most 100 microns, adjusting the flocculating properties of the dispersions to form clumps of fibers therein, and depositing the clumped fibrous material of both dispersions to form thereon a fluid-permeable microporous layer wherein a proportion of fibers extend in a direction outwardly from the porous base at an angle greater than about 30°, sufficient to impart to the layer a maximum pore diameter of less than 10 microns and a voids volume of at least 75%.

2. A process as in claim 1 wherein the fibrous material employed in at least one of the dispersions comprises fibrous material having an average fiber diameter between 0.005 and 2 microns, and an average fiber length of between 5 and 1000 microns.

3. A process as in claim 1 wherein the fibrous material is potassium titanate.

4. A process as in claim 1 wherein the fibrous material is asbestos.

5. A process as in claim 1 wherein the fibrous material is glass.

6. A process as in claim 1 wherein the coating dispersion also contains a binding agent.

7. A process as in claim 6 wherein the binding agent in at least one of the dispersions comprises a polyepoxide resin and a curing agent therefor.

8. A process as in claim 1 wherein the anchoring dispersion comprises up to 75% of a nonfibrous particulate material.

9. A process as in claim 8 wherein the fibrous material is asbestos and the nonfibrous material is silica.

10. A process as in claim 1 which comprises forming the microporous layer by at least two applications of the coating dispersion.

11. A microporous fluid-permeable material capable of removing ultrafine particles from fluids, comprising a porous base having superimposed thereon and adherent thereto a microporous layer impregnating the base to at most a depth of about 100 microns comprising a fibrous material of which a proportion of fibers extend outwardly from the porous base at an angle greater than 30°, sufficient to impart to said layer a maximum pore diameter of less than 10 microns and a voids volume of at least 75 percent.

12. A microporous fluid-permeable material as in claim 11 containing at least two superimposed adherent porous layers, one of said layers having an average pore diameter of less than 10 microns.

13. A microporous fluid-permeable material as in claim 11 wherein the base is paper.

14. A microporous fluid-permeable material as in claim 11 characterized by an adhesion between said microporous layer and the base sufficient to withstand the application of a fluid pressure of at least 3.5 p.s.i. directed outwardly from the base.

15. A microporous fluid-permeable material as in claim 11 wherein the fibrous material comprises potassium titanate fibers.

16. A microporous fluid-permeable material as in claim 11 wherein the fibrous material comprises asbestos fibers.

17. A microporous fluid-permeable material as in claim 11 wherein the porous base carries a polyepoxide resin binder thereon adhering the microporous layer to the porous base.

18. A corrugated filter element capable of removing from a fluid to be treated all dispersed particles having particle sizes of 10 microns and greater, comprising a microporous fluid-permeable material as in claim 11.

19. A corrugated filter element as in claim 18 wherein the base is paper.

References Cited by the Examiner

UNITED STATES PATENTS

| | | | |
|---|---|---|---|
| 1,764,660 | 6/1930 | Sweetland | 210—505 X |
| 2,395,301 | 2/1946 | Sloan | 210—505 X |
| 2,517,753 | 8/1950 | Ximenez | 210—505 X |
| 2,601,597 | 6/1952 | Daniel | 210—508 X |
| 2,895,868 | 7/1959 | Magill | 210—508 X |
| 2,971,907 | 2/1961 | Smith | 210—496 X |

WILLIAM D. MARTIN, Primary Examiner.

ALEXANDER WYMAN, RICHARD D. NEVIUS,
Examiners.